Aug. 12, 1941.  B. M. HYMAN  2,252,377

PICKER CONSTRUCTION

Filed June 27, 1940

Inventor
Benjamin M. Hyman
By Paul O. Pippel
Att'y.

Patented Aug. 12, 1941

2,252,377

UNITED STATES PATENT OFFICE 2,252,377

PICKER CONSTRUCTION

Benjamin M. Hyman, Moline, Ill., assignor to International Harvester Company, a corporation of New Jersey Application June 27, 1940, Serial No. 342,788

9 Claims. (Cl. 56—119)

This invention relates to a picker construction. More specifically it relates to the construction of shields for a corn picker.

With the use of the usual corn pickers having snapping rolls it frequently happens that corn removed from stalks does not fall on the elevators positioned adjacent the snapping rolls so as to be conveyed from the snapping rolls, but falls instead on other parts of the picker and eventually to the ground. The present invention modifies the picker so that ears which do not fall directly onto the elevators will not drop to the ground and be lost.

An object of the present invention is to provide an improved picker construction.

Another object is to provide an improved shield construction which will prevent ears not falling directly on the elevators leading from the snapping rolls from falling to the ground.

According to the present invention the shields or divider points which are placed alongside pairs of snapping rolls of the corn picker are provided with irregular shelf portions which will prevent ears of corn that drop on the shields from rolling to the ground and will instead assure their passage to the conveyers provided alongside the snapping rolls.

Figures 1, 2:
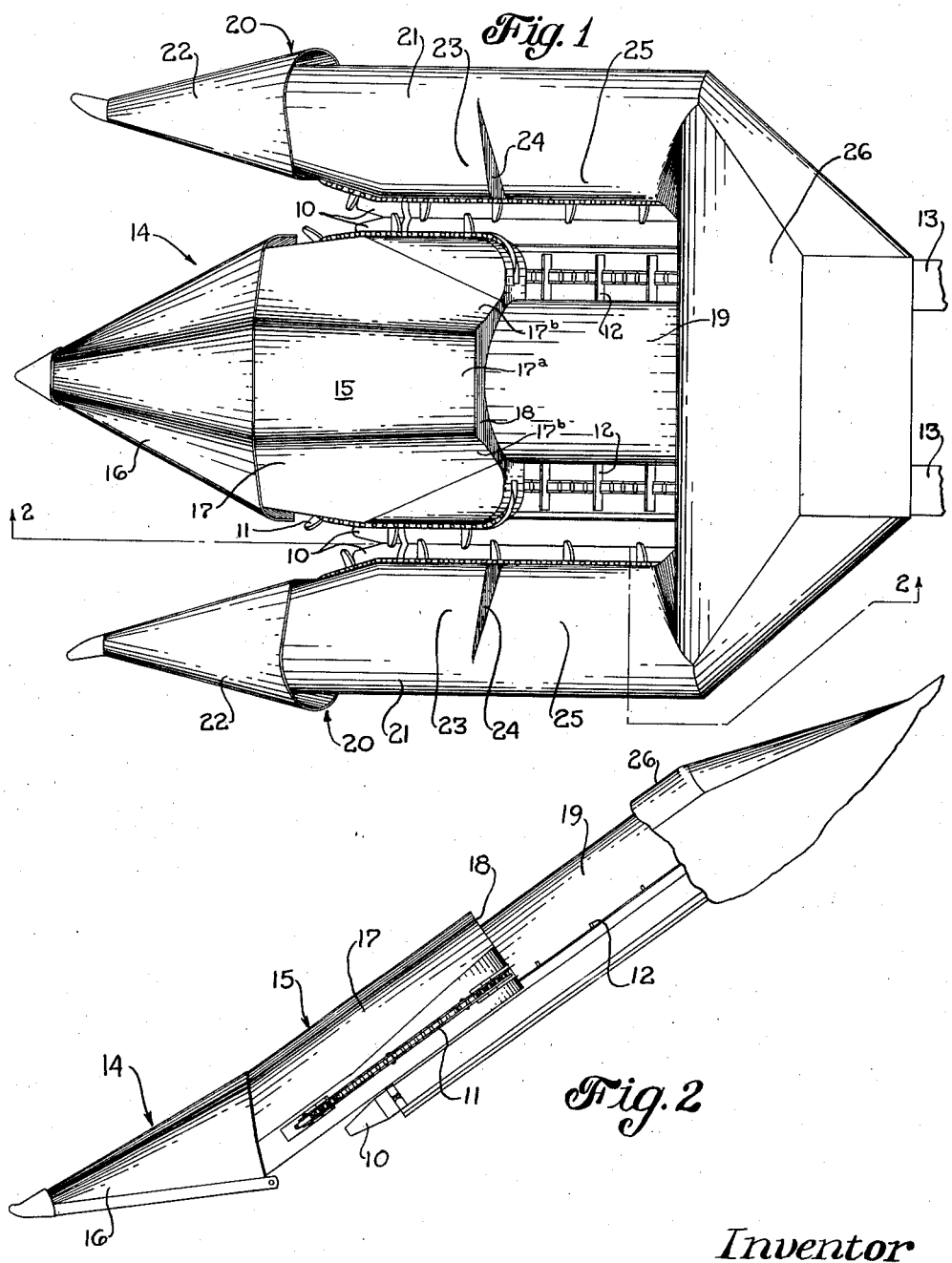
Figure 1 is a plan view of a portion of a pull behind corn picker.
Figure 2 is a section taken along the line 2—2 of Figure 1.

The corn picker of the present invention is shown only in part and, as seen in Figure 1, comprises gathering devices, each composed of pairs of snapping rolls 10. Gathering chains 11 are provided alongside the rolls, and elevators 12 extend from a mid-point of the rolls rearwardly through housings 13 to a thresher, not shown. Between the pairs of snapping rolls there is provided a divider point or shield 14 composed of a main part 15 and a nose 16, which may be vertically angularly adjustable with respect thereto. The main part 15 is composed of a portion 17 which extends upwardly and rearwardly in the direction of the snapping rolls, a second portion 18 which extends downwardly and rearwardly for a short space, and a portion 19 which extends upwardly and rearwardly from the portion 18 at an intermediate point in the length of the snapping rolls 10. It will be seen that the portion 19 is of narrower width than the portion 17, and thus space for the elevators 12 is provided. A central section 17a of the portion 17 has only an upward and rearward slope while side sections 17 may be extended downwardly toward the pairs of snapping rolls 10. The portion 19 is of a generally arcuate contour so as to slope on both sides of a longitudinal center line toward the elevators 12.

On either side of the central divider point 14 side divider points 20 are provided, each of which includes a main part 21 and a part 22 adjustable vertically angularly with respect to the part 21. The main part 21 is composed of a portion 23 extending upwardly and rearwardly, a portion 24 extending downwardly and rearwardly approximately opposite the corresponding portion 18 on the central divider point 14 at an intermediate point of the rolls, and a portion 25 extending upwardly and rearwardly from the portion 24. It will be seen from Figure 1 that the main part 21 of each side divider point 20 slopes for the most part toward the snapping rolls 10 although there is a very small section on the outer side which slopes in the opposite direction. The beginning of this slope is at about the point where the portion 24 disappears and the portions 23 and 25 merge directly into one another. The rear end of the divider points 14 and 20 are joined by a generally transversely extending covering 26 which extends upwardly and rearwardly from a point slightly above the rear of the portion 19 of the central divider point 14.

The downwardly and rearwardly extending portions 18 and 24 on the divider points 14 and 20, respectively, are, in effect, shelves which interrupt the smooth forward and downward inclination of the divider points. Their purpose is to impede the movement of ears of corn along the divider points so that they do not roll onto the ground but instead move along the portions 18 and 24 and eventually reach the elevators 12. In normal operation of the picker, corn stalks pass between the pairs of snapping rolls 10, ears are snapped from the stalks, and are conveyed rearwardly from the snapping rolls by the elevators 12. It sometimes happens that ears are separated from the stalks in such a way as to fall, not directly into the elevator 12, but on the shield 26 or the portions 19 and 25 of the divider points 14 and 20, respectively. Since these parts are inclined downwardly and forwardly, the ears of corn roll forwardly and downwardly toward the ground along the divider points. Their movement along the points is stopped by the portions 18 and 24, which cause them to move toward the snapping rolls 10 and the elevators 12, by means of which they are conveyed away.

Without these shelf portions 18 and 24, the ears might continue to roll down along the points and fall to the ground where they would be lost.

It will be appreciated from the foregoing description that a new and novel harvester construction has been provided which has the surfaces of the shields so contoured that crops falling upon the shields, which might otherwise roll down the shields and be lost, move to shelf or guide portions on the shields by means of which they pass to conveyers and are taken away.

The intention is to limit the invention only within the scope of the appended claims.

What is claimed is:

1. A harvester having a harvesting device and a shield at one side of the device extending upwardly and rearwardly to an intermediate point of the device, then downwardly for a short distance, and then upwardly and rearwardly.

2. A harvester having spaced harvesting devices and a divider between the devices inclining upwardly and rearwardly to an intermediate point of the devices, then downwardly and rearwardly for a short distance, and then upwardly and rearwardly.

3. A picker construction comprising a pair of snapping rolls and a shield at one side of the rolls extending upwardly and rearwardly to an intermediate point of the rolls, then downwardly and rearwardly for a short distance, and then upwardly and rearwardly.

4. A picker construction comprising spaced pairs of snapping rolls and a shield between the pairs of rolls extending upwardly and rearwardly to an intermediate point of the rolls, then downwardly, and then upwardly and rearwardly.

5. A picker construction comprising spaced pairs of snapping rolls, a shield between the pairs of rolls having a first portion extending upwardly and rearwardly to an intermediate point of the rolls, a second portion at the intermediate point of the rolls extending downwardly and rearwardly for a short distance, and a third portion extending upwardly and rearwardly from the second portion and being narrower in width than the first portion, and a pair of elevators, one between each pair of rolls and the third portion of the shield.

6. A picker construction comprising spaced pairs of snapping rolls, a shield between the pairs of rolls extending upwardly and rearwardly to an intermediate point of the rolls, then downwardly, and then upwardly and rearwardly, and a pair of shields, one positioned on the outside of each pair of rolls and extending upwardly and rearwardly to an intermediate point of the rolls, then downwardly, and then upwardly and rearwardly.

7. A picker construction comprising spaced pairs of snapping rolls, three divider points, one between the pairs of rolls and the other two on the outside of the rolls, each point having a first portion extending upwardly and rearwardly to an intermediate point of the rolls, a second portion at the intermediate portion extending downwardly, and a third portion extending upwardly and rearwardly from the said intermediate portion, the third portion of the divider point between the rolls being narrower than the first portion, and a pair of elevators, one between each pair of rolls and the third portion of the divider point between the pairs of rolls.

8. A picker construction comprising spaced pairs of snapping rolls, three divider points, one between the pairs of rolls and the other two on the outside of the rolls, each divider point having an inclined surface extending upwardly and rearwardly and having at a point opposite an intermediate point of the rolls a means for preventing material rolling down the portion of the divider points above the said intermediate point of the rolls from rolling down the portion of the divider point below the said intermediate point.

9. A picker construction as specified in claim 8, and further including elevators extending upwardly and rearwardly along the rolls from the said intermediate point thereof.

BENJAMIN M. HYMAN.